United States Patent
Shread

(10) Patent No.: US 11,317,299 B1
(45) Date of Patent: Apr. 26, 2022

(54) MAPPING CELLULAR COMMUNICATIONS COVERAGE USING CONNECTED DEVICES

(71) Applicant: Deltran Operations USA, Inc., Deland, FL (US)

(72) Inventor: Peter Shread, Deland, FL (US)

(73) Assignee: DELTRAN OPERATIONS USA, INC., Deland, FL (US)

(*) Notice: Subject to any disclaimer, the term of this patent is extended or adjusted under 35 U.S.C. 154(b) by 0 days.

(21) Appl. No.: 17/132,890

(22) Filed: Dec. 23, 2020

(51) Int. Cl.
| | |
|---|---|
| *H04W 16/18* | (2009.01) |
| *H04M 1/725* | (2021.01) |
| *H04W 52/02* | (2009.01) |
| *H04W 8/22* | (2009.01) |
| *H04W 64/00* | (2009.01) |
| *H04W 88/02* | (2009.01) |

(52) U.S. Cl.
CPC ........... *H04W 16/18* (2013.01); *H04M 1/725* (2013.01); *H04W 8/22* (2013.01); *H04W 52/0251* (2013.01); *H04W 64/00* (2013.01); *H04W 88/02* (2013.01)

(58) Field of Classification Search
CPC ....... H04W 16/18; H04W 64/00; H04W 8/22; H04W 52/02; H04W 88/02; H04W 52/0251; H04W 52/44; H04W 76/00; H04W 76/18; H04W 76/19; H04W 88/00; H04W 88/04; H04W 88/08; H04W 92/18; H04W 60/00; H04W 60/04; H04W 60/02; H04W 52/00; H04W 4/02; H04W 4/023; H04W 4/029; H04W 4/021; H04W 12/63; H04W 40/20; H04W 40/24; H04W 40/0246; H04W 40/0248; H04W 40/205; H04M 1/725

IPC ................................ H04W 88/02,64/00, 52/44
See application file for complete search history.

(56) References Cited

U.S. PATENT DOCUMENTS

| | | | |
|---|---|---|---|
| 2009/0156206 A1* | 6/2009 | Rathonyi et al. | 455/434 |
| 2011/0201350 A1* | 8/2011 | Das et al. | 455/456.1 |
| 2012/0032845 A1* | 2/2012 | Dick | 342/357.63 |
| 2014/0070991 A1* | 3/2014 | Liu et al. | 342/357.63 |
| 2015/0369900 A1* | 12/2015 | Pan et al. | G01S 5/0252 |
| 2017/0123073 A1* | 5/2017 | Jakupi et al. | G01S 19/26 |
| 2018/0242102 A1* | 8/2018 | Leveque et al. | H04W 4/02 |
| 2020/0236492 A1* | 7/2020 | Leveque et al. | H04W 4/02 |
| 2021/0084607 A1* | 3/2021 | Dupray et al. | H04W 64/00 |
| 2021/0084610 A1* | 3/2021 | Fong et al. | H04W 64/003 |

OTHER PUBLICATIONS

Opensignal "How Opensignal measures mobile network experience", Methodology Overview Presentation, Jun. 2020.

* cited by examiner

*Primary Examiner* — Meless N Zewdu
(74) *Attorney, Agent, or Firm* — Fox Rothschild LLP; Carol E. Thorstad-Forsyth

(57) ABSTRACT

Cellular communication network is managed by receiving at a computing device certain data specifying geolocation information of one or more user equipment in communication with one or more nodes of the cellular communication system. The computing device identifies a disruption in receipt of the periodic geolocation information, and uses the received geolocation information to at least partially define a location of a peripheral edge of a communication dead zone. The peripheral edge information is used to facilitate a dynamic modification or control of the cellular communication network and/or the user equipment.

20 Claims, 6 Drawing Sheets

MAPPING CELLULAR COMMUNICATIONS COVERAGE USING CONNECTED DEVICES

BACKGROUND

Statement of the Technical Field

The technical field of this disclosure concerns cellular communication systems and more particularly methods and systems for responding to gaps in cellular communication coverage.

Description of the Related Art

Cellular communication systems are communications networks that provide wireless communications for mobile terminals which are sometimes referred to as user equipment (UE) or subscriber terminals (ST). These types of communications systems are designed to provide communications coverage within a given geographic coverage area, which is divided up into a plurality of cells. Each cell covers a defined portion of the geographic coverage area and is served by a base transceiver station. As the UE travels through the coverage area in a conventional cellular communication system, responsibility for communications will transition from a base transceiver station of one cell to a base transceiver station of an adjacent cell. This arrangement facilitates continuous communication services for the UE. But for various reasons cellular communications systems can sometimes have gaps in coverage. Such gaps can result in communication dead zones where UE communication is not supported. These gaps in coverage are problematic as they can result in missed calls and user dissatisfaction with the service provider.

SUMMARY

This document concerns a method and system for managing a cellular communication network. The method involves receiving at a computing device certain data specifying geolocation information of one or more user equipment in communication with one or more nodes of the cellular communication system. The method further involves identifying by the computing device a disruption in receipt of the periodic geolocation information from the one or more user equipment. The final geolocation information received from the one or more user equipment immediately prior to the disruption is determined by the computing device and then used to at least partially define a location of a peripheral edge of a communication dead zone in which communication with the one or more user equipment is disrupted. This peripheral edge information is then used by the computer system to facilitate a dynamic modification of at least one operating characteristic of the cellular communication network or the user equipment.

In some scenarios, the method can involve a further determination by the computing device regarding emergent geolocation information. Emergent geolocation information specifies a geolocation of the user equipment at a time of an emergence of the user equipment from the communication dead zone. Emergent geolocation information will correspond to a location of the user equipment when communication between the cellular communication network and the user equipment is resumed.

The dynamic modification of the cellular network as described herein can involve various actions. In some scenarios, the computing system cause the cellular network to automatically or dynamically reduce an area of the dead zone defined by the peripheral edge of the dead zone. Such reduction can be accomplished in various different ways. For example, the dynamic modification can involve modifying one or more communication system parameter, such as a transmitter power, a condition of an adaptive antenna array, a coding scheme, and/or a frequency band used by the one or more nodes to communicate with the one or more user equipment. Alternatively, or in addition to such actions, the dynamic modification can involve modifying with respect to the user equipment one or more of a transmitter power, a condition of an adaptive antenna array, a coding scheme, and/or a frequency band used to communicate with the one or more nodes when the user equipment is present within the dead zone.

The method can also involve communicating with the one or more user equipment to identify the boundaries of the dead zone. For example, the computing device can receive from the user equipment, after the emergence of the user equipment from the communication dead zone, certain information specifying internment geolocation information. Such internment geolocation information can be information which specifies one or more geolocations of the user equipment where the user equipment was present during the communication disruption. In other words, such emergent geolocation information will specify the location of the user equipment (e.g. as determined by an onboard GPS) within the communication dead zone.

In a solution described herein the user equipment can be configured to selectively interrupt geolocation reporting transmissions to the one or more nodes when the user equipment is within a geographic area defined by the communication dead zone. For example, this can be facilitated by placing into a low-power or sleep mode the geolocation detection equipment (e.g. a GPS) and/or a wireless communication module which facilitates such transmissions. Further, the user equipment can selectively interrupt or modify an operation of at least one onboard geolocation service (e.g., a software service or a hardware service) when the user equipment is within a geographic area defined by the communication dead zone. Similarly, the user equipment can be caused to enter a low-power mode in which the at least one onboard geolocation service is powered-down or placed in a sleep mode to conserve power when the user equipment is stationary.

The solution described herein can be implemented in a computing system which includes a processor and a non-transitory computer-readable storage medium. The non-transitory computer-readable storage medium can comprise programming instructions that are configured to cause the processor to implement a method as described herein for managing a cellular communication network.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
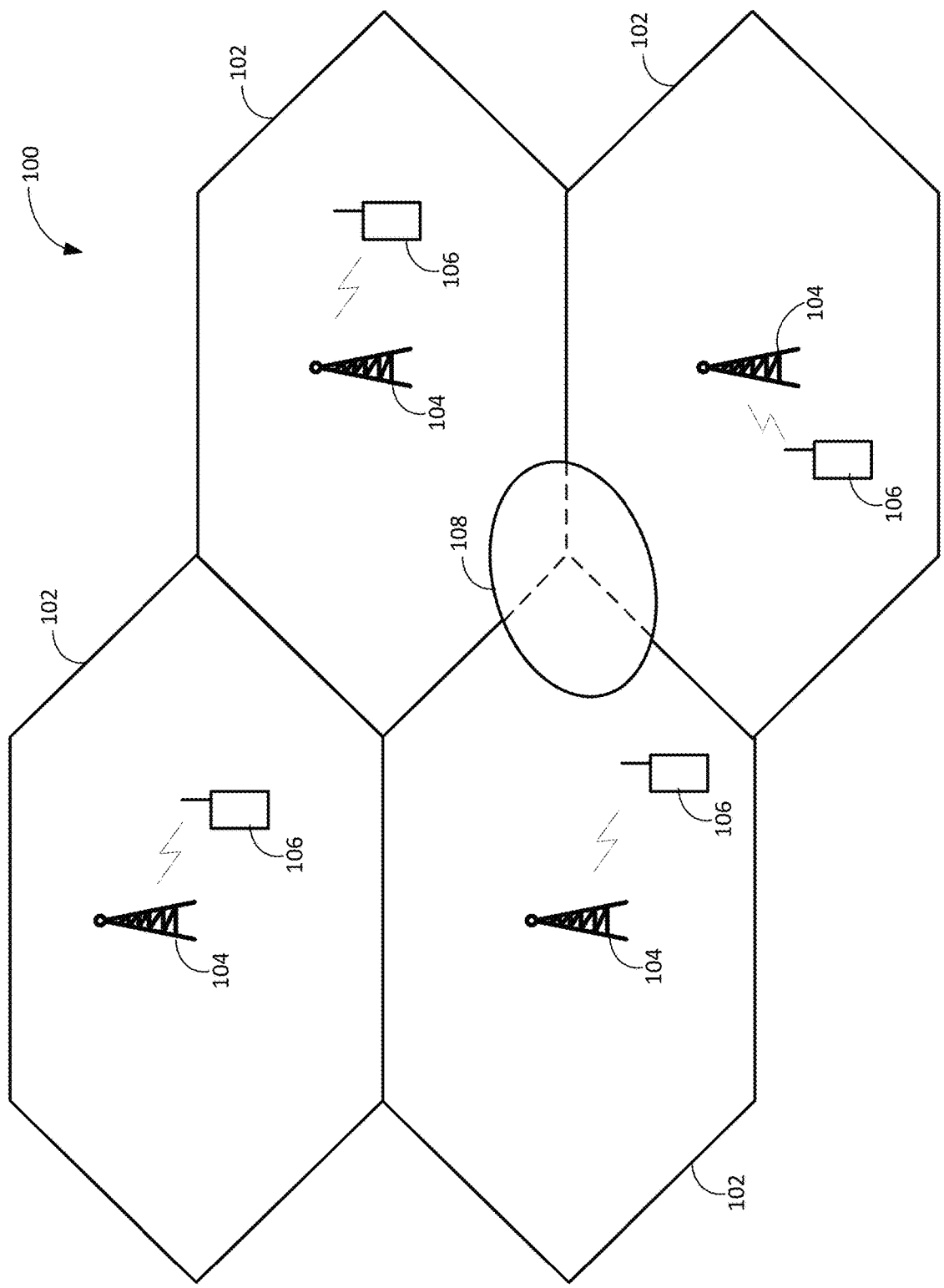
FIG. 1 is a drawing that is useful for understanding a communication dead zone in a cellular communication system.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and/or systems disclosed herein can provide certain advantages in a cellular communication network. In a solution described herein, cellular connected user equipment (UE) as described herein can comprise at least a global positioning system (GPS) and a cellular communications transceiver operating under the control of a computer processor. The GPS makes use of radio signals from a plurality of earth-orbiting satellites to accurately acquire GPS location information which specifies a geolocation of the UE on the surface of the earth. The UE is configured to use the cellular transceiver, the cellular communication network and computer network infrastructure to communicate with a central server (CS). In particular, the UE is configured to regularly communicate or report to the CS the GPS location information ascertained by the UE.

As is known, a cellular network can sometimes include communications dead zones where there are unintended gaps in cellular communication coverage. Such areas exist where the supporting base transceiver station (BTS) in a particular area cannot effectively establish a wireless communication link with one or more UE within that particular area. According to one aspect of a solution described herein, when a UE transitions into such an area, an interruption in the periodic reporting will occur. Such an interruption can be noted and recorded by the CS in a memory location. In some scenarios, the interruption in periodic reporting can also be detected by the UE. For example, such interruption can be identified by the UE based on the absence of a predetermined expected acknowledgment from the CS indicating that the GPS location data has been correctly received by the CS. In other scenarios, the interruption can be identified by the UE based on a received signal strength indication (RSSI) at the UE which indicates that signals from the BTS are below some predetermined threshold level. In certain other scenarios, the interruption can be identified based on the failure or absence of routine handshake communications between the UE and the CS in accordance with a communication protocol associated with the particular cellular network. The CS and/or the UE can use its internal clock to record in a memory location a time when such interruption has occurred.

According to one aspect, the CS will detect and record one or more UE reporting interruptions over time, and will use this information to identify a geographic boundary defining a communication dead zone. When the UE transitions out of the communication dead zone, periodic GPS location reporting to the CS will resume. This resumption of emergent location reporting can also be used to identify a geographic boundary defining a communication dead zone.

In some scenarios, during periods of reporting interruption, the UE can continue to periodically determine and store in a local memory certain GPS location information for the UE. Thereafter, when the UE exits the dead zone, the UE can report to the CS the stored UE locations that were recorded during the period of time associated with the location reporting interruption. For example, location reports can be provided for the period of time which begins when the interruption first occurred and ending when cellular communication is resumed. This geolocation information can be used by the CS and/or the UE to add further definition to the geographic boundary defining the dead zone.

The resulting geographic boundary defining a communications gap or dead zone can be used for several purposes. According to one aspect, the information can be used by a cellular service provider to identify areas where infrastructure service improvements are needed for more complete coverage of a geographic area. According to another aspect, the information can be used by the service provider to dynamically modify operations of cellular communications equipment. For example, when it has been determined that a UE is about to enter a dead zone, a controller for the cellular communication system can optionally choose to utilize a different base transceiver station (BTS) which may have acceptable access to the UEs in the dead zone. Alternatively, a BTS can be caused to modify operation of an adaptive antenna array, transmitter power levels and/or coding gain in a way that helps minimize the geographic size of the dead zone. According to a further aspect, the information can be used to cause the UE to temporarily switch to a different communication mode. For example, the different communication mode may involve a roaming mode, use of a different communications band, a different coding scheme, and/or a transition to communicate using cellular infrastructure of a different common carrier.

To limit power consumption, and reduce unnecessary network traffic, periodic reporting of location data by the UE can be controlled so that the reporting is reduced in frequency or modified under certain conditions. For example, in some scenarios, when the UE has been stationary for some period of time, the UE can notify the CS that it is stationary, after which GPS location reporting may be discontinued until such time that movement of the UE has resumed. Under such conditions, the GPS can be powered down or placed in a low-power mode of operation to conserve power and/or to reduce network traffic. In some scenarios, other components of the UE (such as a wireless communications module) can also be transitioned to a low-power mode.

A schematic representation of a cellular communication system 100 is shown in FIG. 1. For purposes of this disclosure, the system is assumed to be a conventional LTE network in which each BTS is implemented as an evolved base station commonly referred to as an eNodeB or eNB 104. However, it should be understood that the solution is not limited to use in an LTE cellular network. In the cellular communication system 100, each eNB facilitates wireless communications with a plurality of UE 106. In an LTE type system, the plurality of eNB within a defined area are sometimes collectively referred to as comprising an evolved UMTS Terrestrial Radio Access Network (E-UTRAN). The features and functions of an eNB are well known in the art of LTE cellular communications and therefore will not be described here in detail. However, it should be understood that each eNB 104 can facilitate wireless communications with UE within a predetermined geographic area or cell 102.

For various technical reasons, one or more dead zones 108 may exist within the cellular system. These dead zones 108 are geographic areas comprising portions of the one or more cells 102 in which one or more of the eNB cannot effectively communicate with UE 106. The dead zones can exist entirely within a particular cell 104 or can overlap one or more adjacent cells 104.

Figure 2:
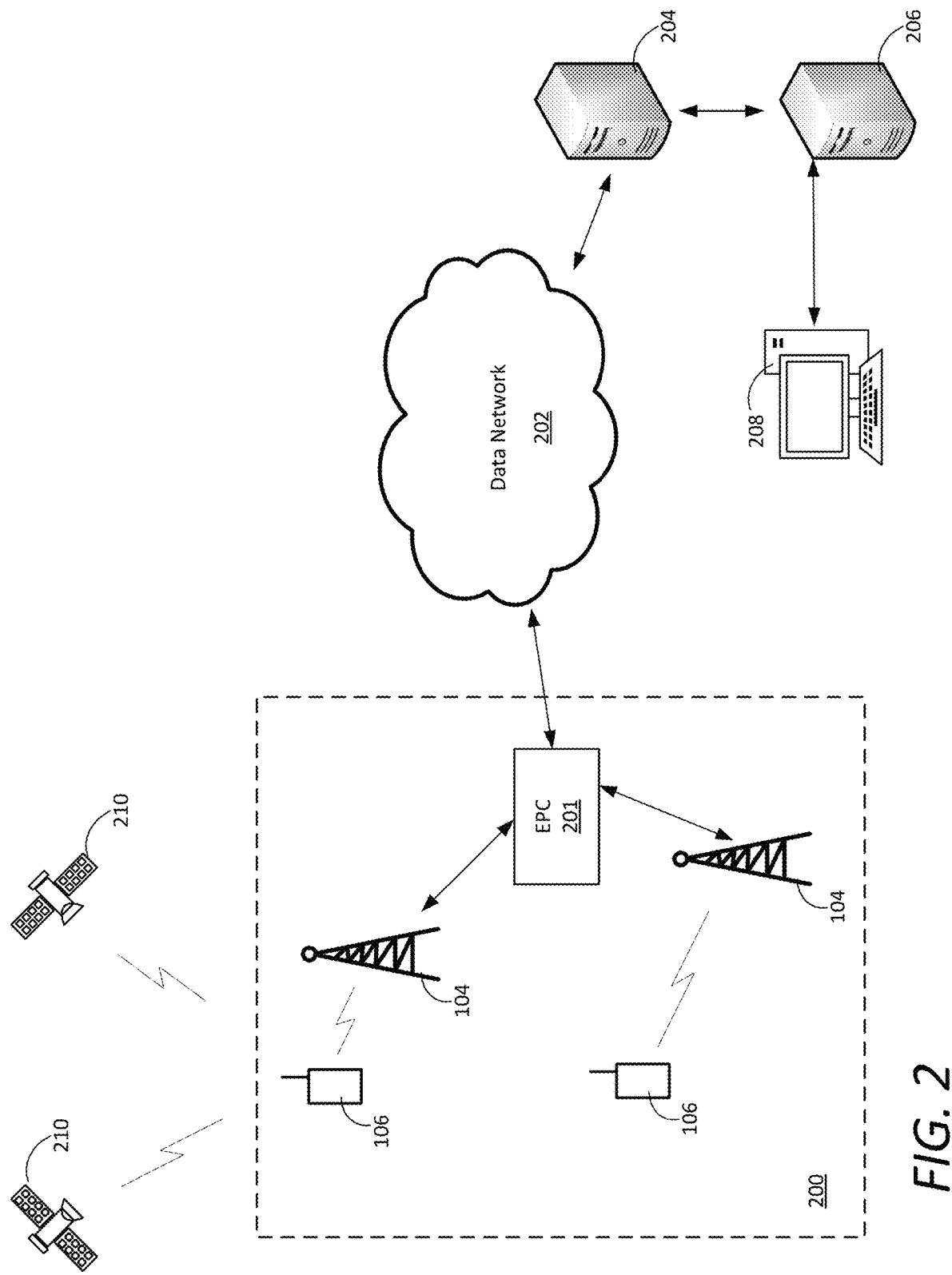
FIG. 2 is a drawing that is useful for understanding a network architecture involving a cellular communication system.

Within a cellular communication system 200, a plurality of eNB 104 operate under the control of an Evolved Packet Core (EPC) 201 as shown in FIG. 2. A detailed description of the functions and features of the EPC is beyond the scope of this disclosure. However, it should be understood that EPC are well-known in the field of LTE communications. Among other functions, the EPC facilitates data communication between the plurality of eNB 104 and an external network, such as data network 202 which may in some scenarios be distinct of the cellular communication system 200. The data network 202 can be any suitable type of public or private data communication network. In combination, the eNB 104 and the EPC 201 allow the UE to have data communication with computer servers and devices internal and external of the cellular communication system 200.

For example, in some scenarios the EPC facilitates data communications between a UE 106 and a central server (CS) 204. In accordance with a solution described herein, an administrative server (AS) 206 can in some scenarios be used in conjunction with the CS 204 to facilitate certain mapping operations. These mapping operations can be requested by a user administrative client computer system 208 as described below in further detail. Also shown in FIG. 2 are GPS satellites 210. GPS satellites 210 are not part of the cellular communication system 200 but independently can facilitate GPS geolocation services for the UE 106. GPS satellites and GPS geolocation services are known and therefore will not be described here in further detail.

Figure 3:
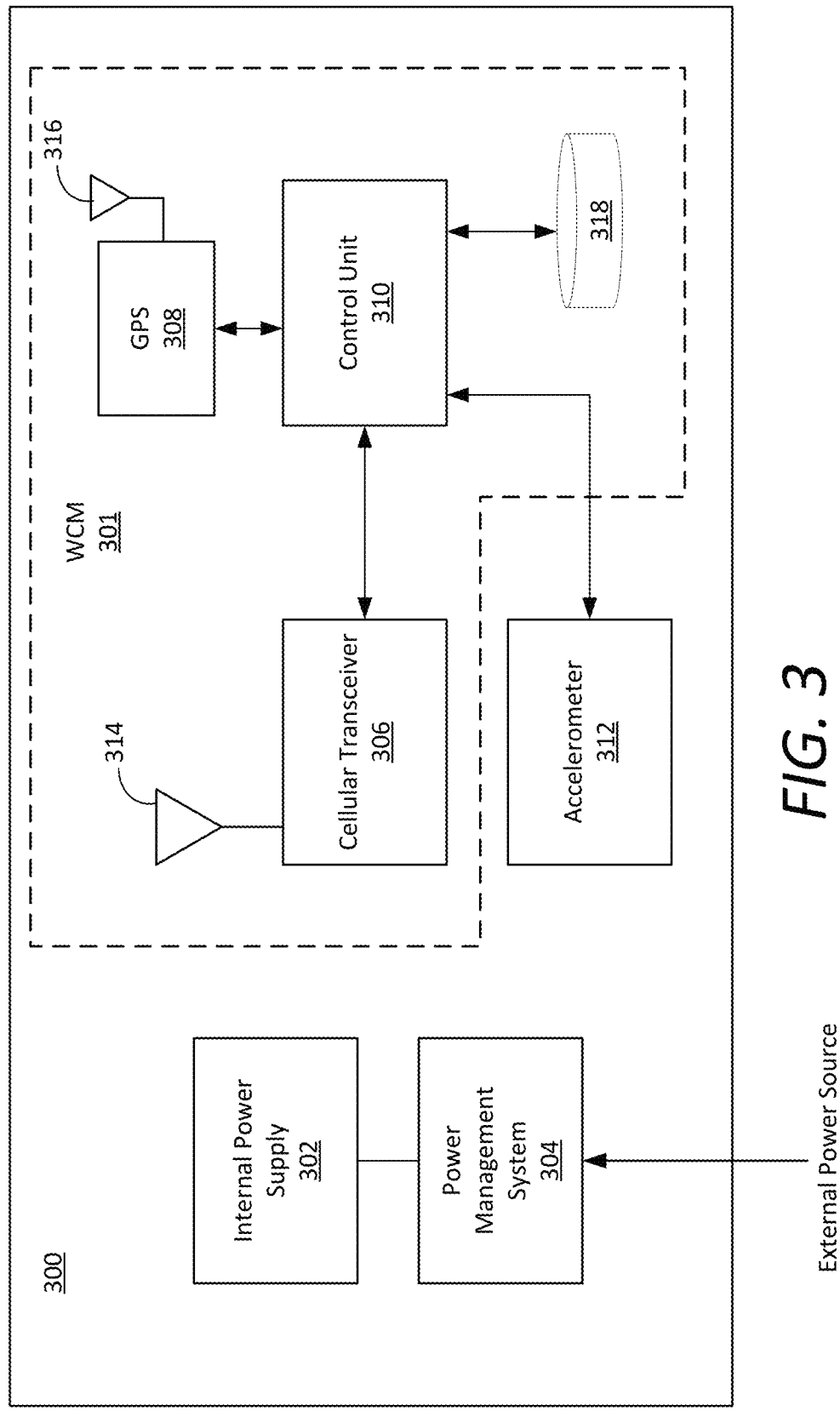
FIG. 3. is a block diagram that is useful for understanding an architecture of certain user equipment used in a cellular communication system.

A UE as described herein can be implemented in various different ways and is not limited to one particular architecture. However, there is shown in FIG. 3 a system architecture for a UE 300 which is useful for understanding the interaction of certain components which advantageously facilitate the mapping operations described herein. The UE 300 includes a wireless communication module (WCM) 301 which can comprise a cellular communications radio transceiver 306, a GPS 308, a control unit 310 and a data store 318. The WCM 301 is configured to facilitate automated wireless data communications using a cellular communication network, such as an LTE network. For example, the WCM 301 can be configured to automatically communicate at various time intervals geolocation data for the UE 300 using a cellular communication data transmission protocol defined by cellular communication system 200. This data is advantageously communicated to a remote server (e.g. CS 204) using data network 202.

The control unit 310 can comprise one or more components such as a processor, a microcontroller, an application specific circuit, a programmable logic device, or other circuit programmed to perform the functions described herein. A typical combination of hardware and software can be a microcontroller which is programmed to perform operations for carrying out the various functions described herein.

The cellular transceiver 306 can comprise any suitable type of wireless communication transceiver that is configured to communicate data in accordance with an air interface defined by the cellular communication system 200. The system can include a radio frequency antenna 314 to facilitate cellular communications between the cellular transceiver 306 and one or more BTSs of a cellular communication system.

The GPS 308 can include at least one GPS antenna 316 to facilitate receiving of GPS signals from one or more GPS satellites. The GPS 308 operates under the control of the control unit 310 to provide geolocation for the UE. Geolocation information received by control unit 310 from the GPS at periodic time intervals can be stored in data storage device 318 for purposes that are described below in further detail.

In some scenarios, the GPS 308 can be configured to actively provide geolocation data to the control unit 310. This data can be provided continuously or only during certain times. At other times, the GPS can be caused (e.g., by the control unit 310) to enter a sleep-mode or to power-down so as to limit overall power consumption of the UE. For example, the GPS can be caused by the control unit to enter a sleep or power-down mode when the control unit 310 determines that the geolocation of the UE has not changed for a certain period of time. A static condition of the UE can be determined based on information from the GPS and/or an accelerometer 312. Other components of the UE can similarly be transitioned to a sleep mode or low-power mode when the UE is determined to be stationary for some period of time. For example, the entire WCM 301 or portions thereof can be caused to enter a low-power or sleep mode for conserving power during those periods of time when a position of the UE has not changed for a predetermined period of time.

In some scenarios, the WCM 301 can comprise an embedded module operating in accordance with an LTE-M communication protocol. As such, the WCM 301 can facilitate direct wireless communication with an eNB in accordance with an LTE-MTC [Machine Type Communication]) protocol. An embedded WCM module as described can facilitate enhanced Machine Type Communication (eMTC) to communicate geolocation data using an LTE network. In some scenarios, the WCM 301 can facilitate a UE connection directly to a 4G network without the need for a gateway. Embedded modules which facilitate such data communications in an LTE network are commercially available. For example, the WCM 301 can comprise a BG96 type of Cat M1/Cat NB1/EGPRS module which is commercially available from Quectel Wireless Solutions Co., Ltd of Shanghai, China.

According to one aspect, a data output of the accelerometer 312 can be advantageously utilized by the control unit 310 to determine when movement of the UE has resumed after the GPS is powered-down or in a sleep mode. For example, the control unit 310 can monitor data output from the accelerometer 312. The control unit 310 is advantageously configured to evaluate such data so as to determine when the UE is moving or accelerating, and when the UE is stationary. In some scenarios, the control unit can use the information from the accelerometer 312 to determine that a geolocation of the UE is no longer static. Under such conditions, the control unit can cause the GPS 308 to resume normal operation and resume reporting of geolocation data to the control unit 310. The control unit 310 can periodically store in a memory location 318 the geolocation information received from the GPS.

Power for operating the UE can optionally be provided from an internal power supply 302 or from an external power source. The UE 300 shows an internal power supply 302 but it should be understood that the solution is not limited in this regard. If an internal power supply is used, it may be implemented in the form of a battery, which in some scenarios may be rechargeable. According to one aspect, the external power source can comprise a vehicle electrical system. Power management in the UE is facilitated by the power management system 304. The power management system 304 can regulate a charging current and voltage supplied to the internal power supply 302 and/or can facilitate voltage regulation to the various sensitive electronic components of the UE.

The CS 204 and AS 206 can be realized in one computer system or several interconnected computer systems. Any kind of computer system or other apparatus adapted for carrying out the methods described herein is suited. A typical combination of hardware and software for implementing the CS 204 and/or AS 206 can be a general-purpose computer system. The general-purpose computer system can have a computer program that can control the computer system such that it carries out the methods described herein.

Computer systems as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device.

Figure 4:
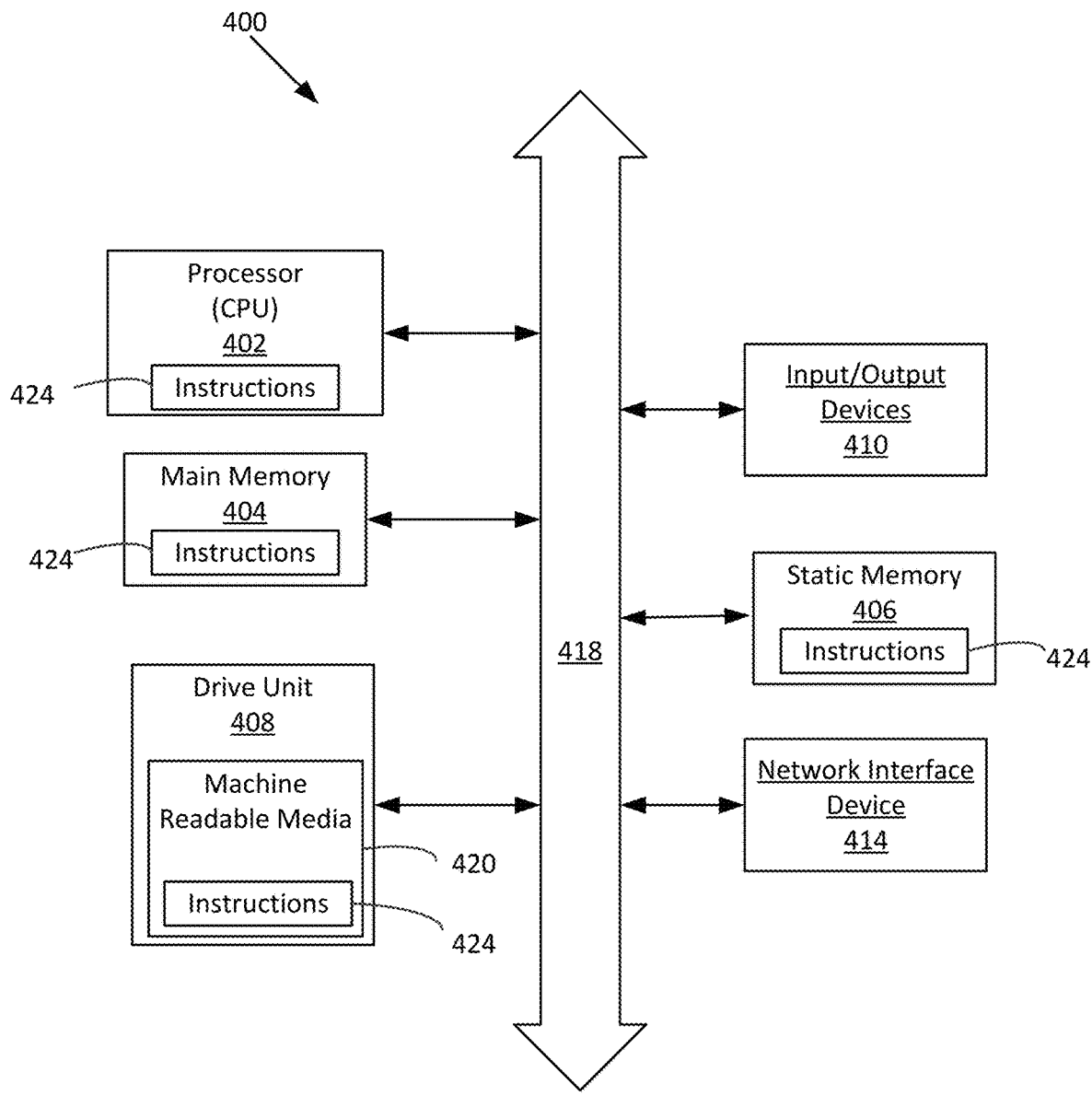
FIG. 4 is a block diagram that is useful for understanding an architecture of a computing device.

Referring now to FIG. 4, there is shown a hardware block diagram comprising an exemplary computer system 400. The machine can include a set of instructions which are used to cause the computer system to perform any one or more of the methodologies discussed herein. In a networked deployment, the machine can function as a server or a router. In one or more scenarios, the exemplary computer system 400 can correspond to each of the computer systems comprising CS 204 and AS 206. Exemplary computer system 400 is also useful for understanding certain aspects of a microcontroller as may be used in a UE 300. In some scenarios, the computer system 400 can operate independently as a standalone device. However, the disclosure is not limited in this regard and in other scenarios the computer system can be operatively connected (networked) to other machines in a distributed environment to facilitate certain operations described herein. Accordingly, while only a single machine is illustrated it should be understood that in other scenarios the system can be taken to involve any collection of machines that individually or jointly execute one or more sets of instructions as described herein.

The computer system 400 is comprised of a processor 402 (e.g. a central processing unit or CPU), a main memory 404, a static memory 406, a drive unit 408 for mass data storage and comprised of machine readable media 420, input/output devices 410, and a network interface device 414. Communications among these various components can be facilitated by means of a data bus 418. One or more sets of instructions 424 can be stored completely or partially in one or more of the main memory 404, static memory 406, and drive unit 408. The instructions can also reside within the processor 402 during execution thereof by the computer system. The network interface device 414 can be comprised of hardware components and software or firmware to facilitate wired or wireless network data communications in accordance with a network communication protocol utilized by a data network.

The drive unit 408 can comprise a machine readable medium 420 on which is stored one or more sets of instructions 424 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 400 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Figure 5:
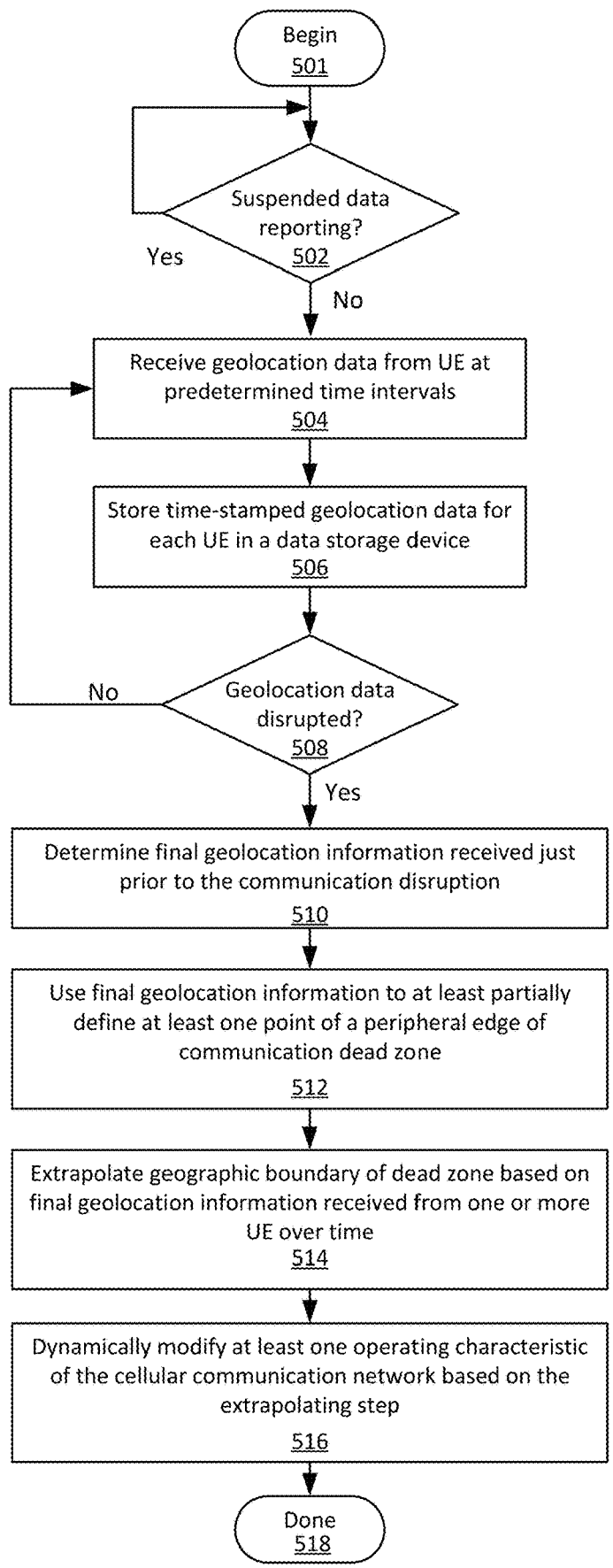
FIG. 5 is a flow chart that is useful for understanding the manner in which certain geolocation reporting information can be used to facilitate identification of a communication dead zone.

Shown in FIG. 5 is a flowchart which is useful for understanding certain operations communication dead zone mapping operations which can be performed by a computing device. In some scenarios the computing device can comprise a server computer such as CS 204, AS 206 and/or a client computer system 208. The process begins at 501 and continues to 502 where a determination is made as to whether geolocation data reporting from a UE has been intentionally suspended (i.e., for reasons other than a communication disruption). Such a suspension in reporting geolocation data can occur for any of several different reasons. For example, in some scenarios geolocation data reporting can be intentionally suspended when the UE has been stationary for an extended period of time. In other scenarios, reporting of geolocation data can be intentionally suspended because the UE has been powered down or has been intentionally transitioned to a low-power mode of operation. In other scenarios, privacy settings can allow a user to intentionally suspend communication of geolocation reporting data as described herein. When any of these conditions occur, the UE can notify the computer device that the geolocation reporting described herein has been temporarily suspended, after which the UE will temporarily suspend regular reporting of geolocation data. When the computing device is notified of such temporary reporting suspension (502: Yes), the temporary interruption in data will be ignored and will not be treated as a communication disruption. If data reporting has not been suspended, the process continues on to 504.

At 504 the computing device receives geolocation data from one or more UE (e.g., UE 106) at certain time intervals. For example, the time interval can be less than one second or as great as one minute. Shorter time intervals are advantageous as they can allow more accurate location determination but this must be balanced against other considerations such as power consumption, network traffic and data usage. The time intervals can be periodic or aperiodic and comprise geolocation information specifying a location of a particular UE.

Geolocation information can in some scenarios include heading information. The heading information can specify a direction and speed of travel information. The direction and/or speed of travel information can be derived by the UE based on GPS data. In some scenarios, each geolocation data message transmitted by the UE can be time stamped to indicate a time when the geolocation information was ascertained by the UE. The geolocation data can also include information identifying the particular UE from which the data originated. Such identifying information can include a user identification value or any other type of suitable information which can allow the geolocation information to be associated with a particular UE.

The geolocation information can be determined at the UE using any suitable means. For example, an onboard GPS 308 can be used for this purpose. The geolocation data is communicated to the computing device using a wireless communication service such as cellular communication system 200 and data network 202. When the geolocation data is received, the information is stored in a data storage device at 506.

At 508 a determination is made as to whether a disruption has occurred with regard to receiving geolocation data from a particular UE. This determination can occur in any suitable way provided that reporting disruptions are detected within a relatively short period of time after occurrence. For example, in a scenario in which location reporting normally occurs at least once every 10 seconds, a communication disruption can be declared or flagged when no geolocation data has been received from a particular UE for a period of time greater than 10 seconds or some other maximum duration which has been set.

If there has been no disruption in communication of geolocation data (508: No), the process returns to 504 where the system continues to monitor receipt of geolocation data from one or more UEs. However, if there is an interruption in receipt of geolocation data for one or more UE (508: Yes) then the process continues to 510. In some scenarios, steps 510-516 can be performed concurrently with the receipt of geolocation data from one or more of the UE as described herein. Such analysis can advantageously provide real-time cellular network performance information which can be used as a basis to implement various mitigation strategies. However, the solution is not limited in this regard and system performance analysis of the geolocation data can alternatively be performed subsequently in an off-line process. In both scenarios, UE geolocation data (which can include flagged data associated with communications disruptions) is analyzed to detect gaps in cellular system coverage.

At 510 a determination is made as to the approximate final geolocation of the UE just prior to the occurrence of the communication disruption. In some scenarios, this determination can be made based on only the last reported geolocation data for the UE before the occurrence of the communication disruption. In other scenarios, the determination of final geolocation information just prior to a communication interruption can occur by using one or more of geolocation, heading, speed and/or time stamp data received from a particular UE just prior to the time of the communication disruption.

In some scenarios, a determination of a final geolocation position for a UE can be based on identifying flagged geolocation data from the UE specifying a time at which communication with the computing device was noted. For example, the UE can normally receive an acknowledgement message from the computing device each time that the computing device (e.g. CS 204) has received geolocation data from a particular UE. When the UE detects that no acknowledgment is received, the UE can flag the geolocation data that was sent by the UE but not acknowledged by the computing device. Generally, the absence of acknowledgment will indicate an interruption in communications with the computing device. When communications with the computing device are restored, the UE can resend the geolocation data that has been previously flagged by the UE. The computing device can store the flagged or marked geolocation data which has been received as being associated with the communication disruption. Based on this data, the computing device (e.g., CS 204) can determine the geolocation of the UE at the time that the communication disruption occurred. In some scenarios, the subsequently reported flagged UE geolocation data generated by the UE can be compared with final geolocation data determined by the computing device (e.g. CS 204). This information can provide a useful verification of the geolocation data associated with the data communication disruption.

At 512, the final geolocation information from a UE at the time of (or just prior to) a communication disruption is used to at least partially define at least one point of a peripheral edge of a communication dead zone. Such a peripheral edge defines a boundary between geolocations where cellular communications are disrupted (i.e., a cellular communication dead zone) and other geolocations where cellular services are functional and not disrupted. At 514, the computing device uses final geolocation information received from one or more UE over a period of time to establish a clearer understanding of the physical boundaries of the communication dead zone. For example, the computing system can use the geolocation information to extrapolate the complete or partial outline of a dead zone based on available geolocation data received from one or more UE. Such extrapolation can involve any suitable technique or method of extending a boundary line or curve by inferring unknown boundary values from trends in the known geolocation data. This process can continue until the geographic outlines of the dead zone are fully defined. Any suitable method of curve fitting or estimating whether now known or known in the future can be used to extrapolate the physical boundary of the dead zone.

The process continues at 516 by applying the available information concerning dead zones. In some scenarios, the available information can be analyzed off-line by system engineers to gain a greater understanding of cellular system performance. The information can also be used to modify the cellular system implementation to eliminate or reduce the occurrence of such communication dead zones. In other scenarios, information concerning the boundaries and/or area comprised by the communication dead zone can be communicated to the UE. This information can then be used to automatically cause the UE to alert the user concerning the presence of such communication dead zone. For example, the user can be alerted to the communication dead zone when their geolocation and heading information acquired by the UE indicate a likelihood that the UE will soon enter the communication dead zone.

However, in a preferred embodiment the information concerning a communication dead zone can be used automatically and dynamically in real time to improve cellular system performance. For example, such a result can be achieved by modifying one or more operational parameters of the network. This can involve dynamically modifying at least one operating characteristic of the cellular communication network based on the learned information regarding communication dead zones. Modifications of such operating characteristics can be performed by one or more of the eNB 104 under the control of the EPC 201, based on information or commands from the computing device (e.g., CS 204, AS 206, and/or a user administrative client computer system 208).

In scenarios in which the information concerning one or more communication dead zones is used dynamically to improve network performance there are various operating characteristics, configurations and/or parameters of the cellular network that can be potentially modified to help mitigate or reduce geographic area of the communication dead zones. For example, when it has been determined that a UE is about to enter a communication dead zone, an EPC 201 can optionally choose to utilize a different eNB 104 which may have acceptable communication access to the UEs in the dead zone. Alternatively, an eNB 104 can be caused to modify operation of an adaptive antenna array (not shown), a transmitter power levels and/or a communication coding scheme in a way that improves system gain or otherwise helps minimize the geographic size of the dead zone. According to a further aspect, the information can be used to cause the UE to temporarily switch to a modified operating mode. For example, the modified operating mode can involve a roaming mode, use of a different communications band, a different coding scheme, and/or a transition to an operating mode involving cellular communications using cellular infrastructure of a different common carrier. The process thereafter can continue at 504 or can terminate at 518.

It will be understood that the occurrence of a disruption of geolocation reporting is interpreted by the computing system herein as defining a boundary of a communication dead zone. However, it should be understood that in most cases, the UE will eventually emerge from the communication dead zone and the geographic location of the UE at such emergent time will also mark a boundary of the communication dead zone. Such emergent geolocation information is defined as a location of a UE at a time of an emergence of the UE from the communication dead zone. It will be understood that such geolocation information will correspond generally to a location of the UE when communication between the cellular communication network and the UE is resumed. This process is generally shown and described in relation to FIG. 6.

Figure 6:
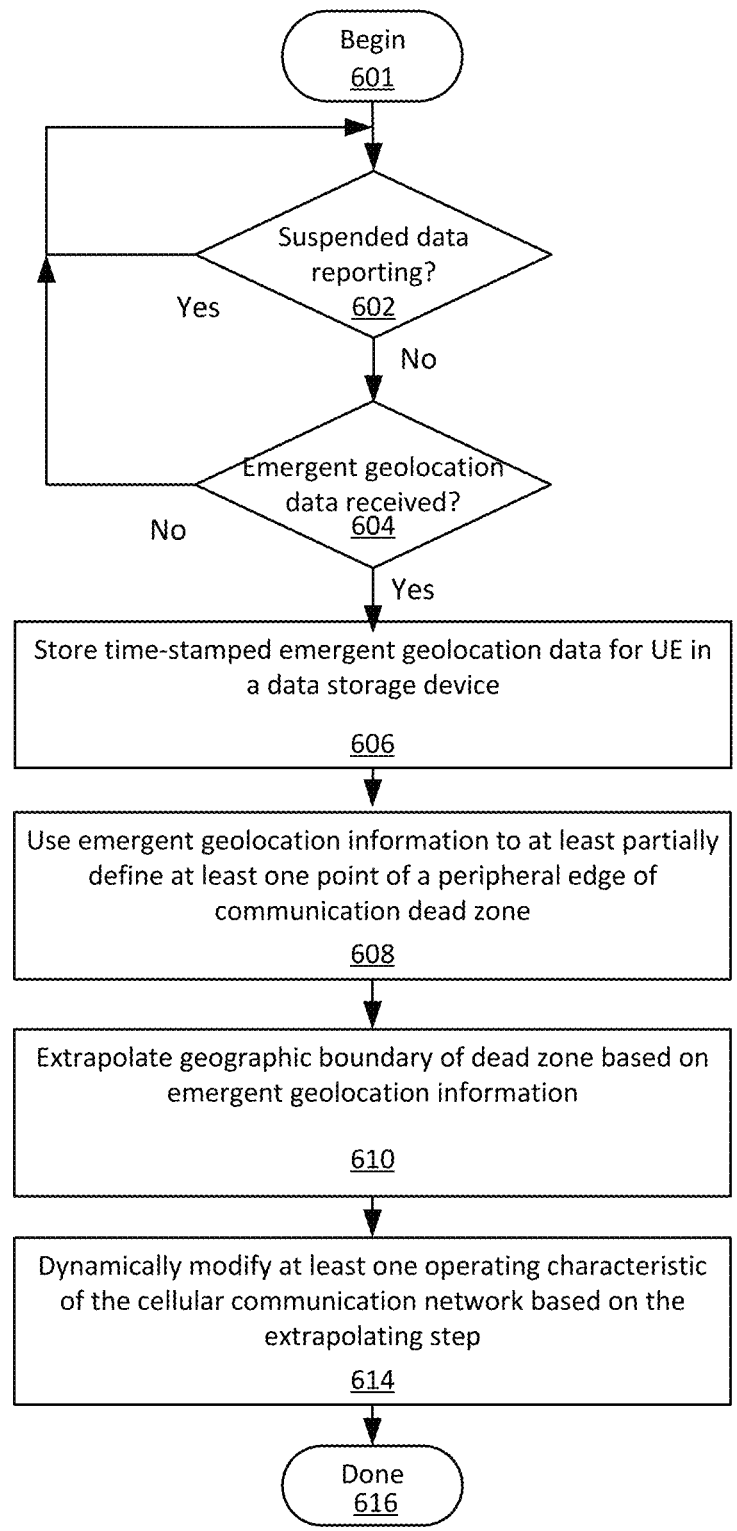
FIG. 6 is a flow chart that is useful for understanding the manner in which emergent geolocation reporting information can be used to facilitate identification of a communication dead zone.

The process in FIG. 6 begins at 601 and continues to 602, where a determination is made as to whether data reporting for a particular UE has been suspended. If so (602: Yes) the system remains in an idle state. If data reporting is not suspended (602: No), the process continues to 604 where a determination is made as to whether emergent geolocation data has been received. If so (604: Yes), then the process continues on to 606 where the system stores time-stamped geolocation data for the UE in a data store. The process then continues to 608 where the emergent geolocation information is used to define at least one point of a peripheral edge of a communication dead zone. At 610 the geographic boundary of the dead zone is extrapolated based on the emergent geolocation data. At 614 one or more operating characteristics of the cellular communication can be modified based on the extrapolating step and/or the outlines of the communication dead zone. The process thereafter continues or terminates at 616.

In some scenarios, the UE can collect and store its geolocation data while it is within a communication dead zone. This information is referred to herein as internment geolocation information. After the emergence of the UE from the communication dead zone internment geolocation information specifying one or more geolocations of the UE, is communicated to the computing device. The computing device can then use this information to further define the geographic area associated with the communication dead zone.

In some scenarios, it can be advantageous to cause the UE to selectively interrupt geolocation reporting transmissions. For example, such selective interruptions can be implemented to reduce power consumption when the UE determines that it is within a geographic area defined by the communication dead zone. For similar reasons, the UE can be caused to selectively interrupt or modify an operation of at least one onboard geolocation service such as GPS 308 when the UE is within a geographic area defined by the communication dead zone. Similarly, for power conservation reasons, the UE can be caused to enter a low-power mode in which the at least one onboard geolocation service is powered-down or placed in a sleep mode to conserve power when the UE is stationary or has a static position. In some scenarios, other components of the UE can similarly be caused to enter a low-power or sleep mode. For example, the entire WCM 301 could be transition to such a power-saving mode when the UE is determined to be in dead zone and/or has been stationary for a predetermined period of time.

It should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for managing a cellular communication network, comprising:
   receiving at a computing device data specifying geolocation information of one or more user equipment in communication with one or more nodes of the cellular communication system;
   identifying by the computing device a disruption in receipt of a periodic geolocation information from the one or more user equipment;
   determining by the computing device a final geolocation information received from the one or more user equipment immediately prior to the disruption;
   using the final geolocation information at the computing device to at least partially define a location of a peripheral edge of a communication dead zone in which communication with the one or more user equipment is disrupted; and
   using information associated with the peripheral edge to dynamically modify at least one operating characteristic of the cellular communication network or the one or more user equipment.

2. The method according to claim 1, further comprising determining by the computing device emergent geolocation information specifying an emergent geolocation of the one or more user equipment at a time of an emergence of the one or more user equipment from the communication dead zone when communication between the cellular communication network and the one or more user equipment is resumed.

3. The method according to claim 1, wherein the dynamic modification is selected to reduce an area of the dead zone defined by the peripheral edge of the dead zone.

4. The method according to claim 1, wherein the dynamic modification comprises modifying at least one of a transmitter power, a condition of an adaptive antenna array, a coding scheme, and a frequency band used by the one or more nodes to communicate with the one or more user equipment.

5. The method according to claim 1, wherein the dynamic modification comprises modifying at least one of a transmitter power, a condition of an adaptive antenna array, a coding scheme, and a frequency band used by the one or more user equipment to communicate with the one or more nodes when the one or more user equipment is present within the dead zone.

6. The method according to claim 1, further comprising communicating with the one or more user equipment to identify boundaries of the dead zone.

7. The method according to claim 1, further comprising receiving by the computing device after an emergence of the one or more user equipment from the communication dead zone information specifying internment geolocation information specifying one or more geolocations of the one or more user equipment during the disruption, while the one or more user equipment was within the communication dead zone.

8. The method according to claim 1, further comprising causing the one or more user equipment to selectively interrupt geolocation reporting transmissions to the one or more nodes when the one or more user equipment is within a geographic area defined by the communication dead zone.

9. The method according to claim 1, further comprising causing the one or more user equipment to selectively interrupt or modify an operation of at least one onboard geolocation service when the one or more user equipment is within a geographic area defined by the communication dead zone.

10. The method according to claim 1, further comprising causing the one or more user equipment to enter a low-power mode in which at least one onboard geolocation service is powered-down or placed in a sleep mode to conserve power when the one or more user equipment is stationary.

11. A computing system, comprising:
   a processor; and
   a non-transitory computer-readable storage medium comprising programming instructions that are configured to cause the processor to implement a method for managing a cellular communication network, wherein the programming instructions comprise instructions to:
   receive data specifying geolocation information of one or more user equipment in communication with one or more nodes of the cellular communication system;
   identify a disruption in receipt of a periodic geolocation information from the one or more user equipment;
   determine a final geolocation information received from the one or more user equipment immediately prior to the disruption;
   using the final geolocation information to at least partially define a location of a peripheral edge of a communication dead zone in which communication with the one or more user equipment is disrupted; and
   use information associated with the peripheral edge to dynamically modify at least one operating characteristic of the cellular communication network or the one or more user equipment.

12. The computing system according to claim 11 wherein an emergent geolocation information specifies an emergent geolocation of the one or more user equipment at a time of an emergence of the one or more user equipment from the communication dead zone when communication between the cellular communication network and the one or more user equipment is resumed.

13. The computing system according to claim 11, wherein the dynamic modification is selected to reduce an area of the dead zone defined by the peripheral edge of the dead zone.

14. The computing system according to claim 11, wherein the dynamic modification comprises a modification of at least one of a transmitter power, a condition of an adaptive antenna array, a coding scheme, and a frequency band used by the one or more nodes to communicate with the one or more user equipment.

15. The computing system according to claim 11, wherein the dynamic modification comprises a modification of at least one of a transmitter power, a condition of an adaptive antenna array, a coding scheme, and a frequency band used by the one or more user equipment to communicate with the one or more nodes when the one or more user equipment is present within the dead zone.

16. The computing system according to claim 11, wherein the programming instructions further comprise instructions to communicate with the one or more user equipment to identify boundaries of the dead zone.

17. The computing system according to claim 11, wherein the computing system is configured to receive, after an emergence of the one or more user equipment from the communication dead zone, information specifying internment geolocation information identifying one or more geo-locations of the one or more user equipment during the disruption, while the one or more user equipment was within the communication dead zone.

18. The computing system according to claim 11, wherein the one or more user equipment is configured to selectively interrupt geolocation reporting transmissions to the one or more nodes when the one or more user equipment is within a geographic area defined by the communication dead zone.

19. The computing system according to claim 11, wherein the one or more user equipment is configured to selectively interrupt or modify an operation of at least one onboard geolocation service when the one or more user equipment is within a geographic area defined by the communication dead zone.

20. The computing system according to claim 11, wherein the one or more user equipment is configured to enter a low-power mode in which at least one onboard geolocation service is powered-down or placed in a sleep mode to conserve power when the one or more user equipment is stationary.

* * * * *